(12) United States Patent
Zhang et al.

(10) Patent No.: US 12,588,074 B2
(45) Date of Patent: Mar. 24, 2026

(54) RANDOM ACCESS FOR RADIO ACCESS NETWORKS

(71) Applicant: Telefonaktiebolaget LM Ericsson (publ), Stockholm (SE)

(72) Inventors: Jianwei Zhang, Solna (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 437 days.

(21) Appl. No.: 17/312,707

(22) PCT Filed: Jan. 29, 2019

(86) PCT No.: PCT/SE2019/050061
§ 371 (c)(1),
(2) Date: Jun. 10, 2021

(87) PCT Pub. No.: WO2020/122781
PCT Pub. Date: Jun. 18, 2020

(65) Prior Publication Data
US 2022/0046723 A1 Feb. 10, 2022

(30) Foreign Application Priority Data
Dec. 14, 2018 (SE) .................................... 1800242-8

(51) Int. Cl.
*H04W 74/08* (2024.01)
*H04W 72/044* (2023.01)
(Continued)

(52) U.S. Cl.
CPC ..... *H04W 74/0841* (2013.01); *H04W 72/044* (2013.01); *H04W 74/04* (2013.01);
(Continued)

(58) Field of Classification Search
CPC ........... H04W 74/0841; H04W 72/044; H04W 74/04; H04W 74/0866; H04W 74/0833; H04W 74/002; H04W 74/0891
See application file for complete search history.

(56) References Cited

U.S. PATENT DOCUMENTS

| | | | |
|---|---|---|---|
| 12,041,660 B2 * | 7/2024 | Takata | ............. H04W 74/0836 |
| 2006/0084432 A1 | 4/2006 | Balasubramanian et al. | |

(Continued)

FOREIGN PATENT DOCUMENTS

| | | |
|---|---|---|
| WO | 2017155438 A1 | 9/2017 |
| WO | 2018126879 A1 | 7/2018 |
| WO | 2018127042 A1 | 7/2018 |

OTHER PUBLICATIONS

European Communication and Written Opinion dated Jan. 11, 2023 for Application No. 19704688.1, consisting of 7 pages.

(Continued)

*Primary Examiner* — Jeffrey M Rutkowski
(74) *Attorney, Agent, or Firm* — Weisberg I.P. Law, P.A.

(57) ABSTRACT

There is disclosed a method of operating a network node in a radio access network, the method including performing a random access response procedure based on a set of access parameters, the random access response procedure being one of a first procedure type and a second procedure type, a first set of access parameters being used for a random access response procedure of the first procedure type and a second set of access parameters being used for a random access response procedure of the second procedure type. The disclosure also pertains to related methods and devices.

18 Claims, 4 Drawing Sheets

(51) Int. Cl.
| | |
|---|---|
| *H04W 74/04* | (2009.01) |
| *H04W 74/0833* | (2024.01) |
| *H04W 74/0838* | (2024.01) |

(52) U.S. Cl.
CPC ... *H04W 74/0833* (2013.01); *H04W 74/0866* (2013.01); *H04W 74/0838* (2024.01)

(56) References Cited

U.S. PATENT DOCUMENTS

| | | | | |
|---|---|---|---|---|
| 2013/0034059 | A1 | 2/2013 | Lee et al. | |
| 2015/0016312 | A1* | 1/2015 | Li | H04W 74/006 |
| | | | | 370/280 |
| 2015/0365976 | A1* | 12/2015 | Lee | H04W 76/14 |
| | | | | 455/422.1 |
| 2017/0231004 | A1 | 8/2017 | Babaei et al. | |
| 2017/0311355 | A1 | 10/2017 | Yi et al. | |
| 2018/0048448 | A1* | 2/2018 | Zhang | H04W 24/10 |
| 2018/0255586 | A1* | 9/2018 | Einhaus | H04W 72/02 |
| 2018/0324653 | A1* | 11/2018 | Nagaraja | H04W 36/302 |
| 2019/0053271 | A1* | 2/2019 | Islam | H04W 52/281 |
| 2020/0053811 | A1* | 2/2020 | Ang | H04W 74/0833 |
| 2020/0059390 | A1* | 2/2020 | Zhang | H04L 1/0007 |
| 2020/0137806 | A1* | 4/2020 | Islam | H04B 7/0408 |
| 2020/0178315 | A1* | 6/2020 | Li | H04W 72/04 |
| 2021/0100037 | A1* | 4/2021 | Karlsson | H04W 74/0833 |
| 2021/0320833 | A1* | 10/2021 | Kim | H04J 11/0073 |
| 2021/0385868 | A1* | 12/2021 | Ying | H04W 74/002 |
| 2022/0279573 | A1* | 9/2022 | Agiwal | H04W 74/0833 |

OTHER PUBLICATIONS

Swedish Notice and Search Report dated Sep. 16, 2019 for Application No. 1800242-8, consisting of 5 pages.

3GPP TS 38.331 V15.3.0 3rd Generation Partnership Project; Technical Specification Group Radio Access Network; NR; Radio Resource Control (RRC) protocol specification (Release 15); Sep. 2018, consisting of 445 pages.

3GPP TS 38.213 V15.3.0 3rd Generation Partnership Project; Technical Specification Group Radio Access Network; NR; Physical layer procedures for control (Release 15); Sep. 2018, consisting of 101 pages.

3GPP TSG-RAN1 Meeting #95 R1-1814381; Title: CR to 38.214 capturing the RAN1#94bis and RAN1#95 meeting agreements; Source to WG: Nokia; Location and Date: Spokane, USA, Nov. 12-16, 2018, consisting of 104 pages.

3GPP TSG-RAN1 Meeting #94bis R1-1812093; Title: CR to 38.214 capturing the RAN1#94bis meeting agreements; Source to WG: Nokia; Location and Date: Chengdu, China, Oct. 8-12, 2018, consisting of 99 pages.

International Search Report and Written opinion dated Jul. 12, 2019 for International Application No. PCT/SE2019/050061 filed Jan. 29, 2019, consisting of 13-pages.

3GPP TSG RAN WG1 Meeting #84 R1-161009; Title: Random Access Procedure for NB-IoT; Agenda Item: 7.2.1.2.2; Source: Lenovo; Document for: Discussion and decision; Date and Location: Feb. 15-19, 2016, St. Julian's, Malta, consisting of 4-pages.

Indian Hearing Notice in Reference of Application No. 202117025074 dated Nov. 9, 2023, consisting of 2 pages.

Communication Pursuant to Article 94(3) EPC dated Oct. 25, 2024, issued in corresponding European Patent Application No. 19 704 688.1, consisting of 6 pages.

3GPP TSG-RAN WG2 Meeting #83 R2-132543, Title: Discussion on TTI bundling, Source: Samsung, Agenda: 6.1.2, Document for: Discussion, Date and Location: Aug. 19-23, 2013, Barcelona, Spain, consisting of 4 pages.

* cited by examiner

10

100

RANDOM ACCESS FOR RADIO ACCESS NETWORKS

CROSS-REFERENCE TO RELATED APPLICATIONS

This application is a Submission Under 35 U.S.C. § 371 for U.S. National Stage Patent Application of International Application No.: PCT/SE2019/050061, filed Jan. 29, 2019 entitled "RANDOM ACCESS FOR RADIO ACCESS NET-WORKS," which claims priority to Sweden Patent Application No.: 18002428, filed Dec. 14, 2018, the entireties of both of which are incorporated herein by reference.

TECHNICAL FIELD

This disclosure pertains to wireless communication technology, in particular in the context of random access for radio access networks.

BACKGROUND

In wireless communication networks like LTE or NR, random access procedures are used by terminals to establish or re-establish a connection with the radio access network, e.g. for updating timing and/or requesting resources.

SUMMARY

It is an object of the present disclosure to provide improved random access in radio access networks. In particular, the disclosure aims at utilising different random access procedures using different variables for better efficiency.

The approaches are particularly advantageously implemented in a 5<sup>th</sup> Generation (5G) telecommunication network or 5G radio access technology or network (RAT/RAN), in particular according to 3GPP (3<sup>rd</sup> Generation Partnership Project, a standardisation organization). A suitable RAN may in particular be a RAN according to NR, for example release 15 or later, or LTE Evolution.

There is disclosed a method of operating a network node in a radio access network. The method comprises performing a random access response procedure based on a set of access parameters. The random access response procedure is one of a first procedure type and a second procedure type. A first set of access parameters is used for a random access response procedure of the first procedure type, and a second set of access parameters is used for a random access response procedure of the second procedure type.

Moreover, a network node for a radio access network is described. The network node is adapted for performing a random access response procedure based on a set of access parameters. The random access response procedure is one of a first procedure type and a second procedure type. The network node is adapted to use a first set of access parameters for a random access response procedure of the first procedure type, and a second set of access parameters being used for a random access response procedure of the second procedure type. The network node may comprise, and/or be adapted for utilising, processing circuitry and/or radio circuitry, in particular a transmitter and/or receiver and/or transceiver, for performing the procedure and/or determining the set of access parameters.

Moreover, a method of operating a user equipment in a radio access network is considered. The method comprises performing a random access request procedure based on a set of access parameters. The random access request procedure is one of a first procedure type and a second procedure type. A first set of access parameters is used for a random access request procedure of the first procedure type, and a second set of access parameters being used for a random access request procedure of the second procedure type.

A user equipment for a radio access network is also proposed. The user equipment is adapted for performing a random access request procedure based on a set of access parameters. The random access request procedure is one of a first procedure type and a second procedure type. A first set of access parameters is used for a random access request procedure of the first procedure type, and a second set of access parameters being used for a random access request procedure of the second procedure type. The user equipment may comprise, and/or be adapted for utilising, processing circuitry and/or radio circuitry, in particular a transmitter and/or receiver and/or transceiver, for performing the procedure and/or determining the set of access parameters.

According to the approaches described, there for different types of random access (RA), e.g. contention-based RA (CBRA) or contention-free RA (CFRA), different sets of access parameters may be used. Thus, the approaches allow adapting to different situations with improved efficiency, e.g. by utilising more suitable resources or bandwidth for RA:

A random access response procedure may be considered a procedure performed by a network node for random access. In particular, a RA response procedure may comprise the actions performed by the network node. A random access request procedure may be considered a procedure performed by a user equipment for random access. In particular, a RA request procedure may comprise the actions performed by the UE. A random access procedure may be considered a general term which may refer to a RA response procedure or a RA request procedure, or a combination thereof, if it is referred to a system of UE and network node. Which meaning is used should be discernable from the context. A random access procedure may comprise transmitting one or more messages, e.g. based on receiving one or more messages, and/or to initiate communication.

It may be considered that the UE and/or network node is adapted for performing a random access procedure of either procedure type. In some cases, the UE and/or network node may be adapted to use either the second set for a procedure of the second procedure type, or the first set, e.g. depending on capability of UE, and/or depending on configuration, e.g. by the network node. Capability of a UE may be indicated to a network node via capability signaling, e.g. for an initial random access. Accordingly, different types of UEs and/or capabilities may be accommodated.

A RA request procedure may be initiated by a UE. However, it may be triggered, e.g. via control signaling and/or configuration, by the network node, e.g. to regain UL synchronisation, or for handover purposes, or it may be triggered by receiving signaling from the network node, e.g. SS/PBCH block signaling. A RA response procedure may be in response to, and/or comprise a response to, a random access preamble transmission from a UE. Different procedure types may be triggered and/or initiated by different devices and/or events and/or types of signaling. Thus, different scenarios may be covered.

It may be considered that the first procedure type may represent contention-based access, and/or the second procedure type may represent contention-free access. Contention-based access may require a contention resolution, e.g. due to signaling (in particular signaling of a RA preamble) being used that is not unambiguously associated to a specific UE.

Initial RA, e.g. when contacting a cell for the first time, may be contention-based. Contention-free RA access may be based on signaling that is unambiguously associated to a specific UE, e.g. using a configured RA preamble and/or RNTI associated to the UE. A UE and/or a network node may be adapted to be able to perform CBRA and CFRA, or more generally, for a first procedure type and a second procedure type.

It may be considered that the first set of access parameters and/or the second set of access parameters comprise/s physical parameters. Physical parameters may in particular be parameters pertaining to radio transmissions and/or the physical layer. Physical parameters may for example pertain to one or more of frequency space used (e.g., bandwidth part), and/or timing (e.g., time until a response is to be transmitted), and/or power and/or transmission scheme (e.g., modulation and/or coding, in particular MCS, or precoding/transform, in particular whether to use SC-FDM/A or OFDM/A), and/or repetition and/or aggregation level. Repetition and/or aggregation may correspond to repetition of transmission (e.g., the full signal, or the same information content) without waiting for a response, and/or repetition in a number of consecutive and/or contiguous slots (or other transmission timing structures), e.g. according to a configured aggregation level or repetition level. Physical parameters may directly affect the coverage and/or transmission efficiency and/or resource utilisation.

It may be considered that the first set of access parameters and the second set of access parameters may comprise different numbers of parameters, in particular different numbers of physical parameters. It should be noted that a parameter may in general have a range of different values. At different occasions, one parameter may have different values. It may in particular be considered that the number of parameters, in particular physical parameters, of the second set is larger than the number of parameters of the first set. In particular, one or more parameters of the second set may be configured to the UE and/or be UE-specific. One or more of the parameters of the first and/or the second set may be predefined and/or broadcast and/or cell-wide (or cell-specific), e.g. indicated based on SS/PBCH block transmission and/or with system information transmission. Different numbers of parameters allow adaption to different RA scenarios.

In some variants, the second set of parameters may comprise one or more parameters configured with Radio Resource Control, RRC, layer signaling and/or be UE specific. One or more of these parameters may be physical parameters. One or more other parameters of the second set may be cell-specific. This facilitates improved random access for UEs that already have or have had connection to be configured.

It may be considered the first procedure type is based on transmission of a random access preamble from a set of random access preambles, wherein the set of random access preambles is predefined and/or cell-wide (also referred to as cell-specific) and/or indicated via broadcast and/or groupcast signaling. This type of procedure may be associated to CBRA and/or initial RA.

Alternatively, or additionally, the second procedure type may be based on transmission of a configured preamble and/or a UE-specific preamble. This type of precure may be associated to CFRA and/or RA for UL (re-) synchronisation.

It may be considered that the second set of access parameters indicates a bandwidth part and/or aggregation level and/or number of repetitions of data transmission and/or timing and/or transmission scheme. In general, one or more parameters may be used for such indication. In some variants, the first set may not comprise such parameters. Accordingly, improved coverage and/or timing and/or resource efficiency may be facilitated.

In particular, the second set of access parameters may comprise on or more parameters pertaining to a transmission on a Physical Uplink Shared Channel, PUSCH, and/or to a transmission on a Physical Downlink Shared Channel, PDSCH. Alternatively, or additionally, it may pertain to a transmission of a RA preamble and/or a RAR. Accordingly, RA messages, in particular msg1, msg2 and/or msg3, may benefit from a configured second set of parameters, which may be adapted to on-going communication.

It may be considered that the first set of parameters may be a subset of the second set of parameters. Thus, the second set may include parameters, in particular physical parameters, of the first set, and may expand the set for improved transmissions.

Also, there is considered a program product comprising instructions adapted for causing processing circuitry to control and/or perform a method as described herein. A carrier medium arrangement carrying and/or storing a corresponding program product is proposed.

In general, cell-specific information and/or parameters may be predefined and/or configured via broadcast or groupcast to a plurality of UEs and/or to an unspecified number of UEs, e.g. using transmission of system information. System information may be transmitted e.g. with SS/PBCH block transmission and/or PBCH transmission and/or PDSCH transmission, which may be associated to SS/PBCH block and/or PBCH transmission. For example, PBCH may indicate, directly or indirectly, where to monitor for the associated PDSCH.

Using a set of parameters for a random access procedure and/or an action thereof may comprise communicating, in particular transmitting and/or receiving, using the set of parameters. In particular, a transmission and/or reception may be according to the set of parameters, in particular physical parameters. For different actions, the parameter values may be the same. However, in some cases, different values may be used at different actions. Transmitting according to a set of parameters may comprise transmitting signaling following the parameters of the set. For a UE, such transmitted signaling may be signaling carrying a random access preamble (msg1) and/or a msg3 (in sequence, with a msg2 reception in between). However, in some cases, msg1 and msg3 may use different sets of parameters, and/or different parameter values. For a network node, transmitted signaling may in particular comprise a random access response (RAR, or msg2), and/or a content resolution message (msg4). Receiving using a set of parameters may comprise monitoring resources according to the set and/or decoding and/or demodulating signaling received based on the set. Receiving and transmitting may be complementary between UE and network node, such that signaling transmitted by one device corresponds to signaling received by the other. It should be noted that a configured parameter that is not used or that is ignored when communicating using a set may be considered to be excluded from the set and/or not be part of the set.

The approaches described herein in particular facilitate use of a basic type RA procedure, which may be valid for all UEs, e.g. independent of advanced capabilities, and a more efficient RA procedure type, e.g. according to capability, in suitable scenarios. It may generally be considered that the second procedure type is performed after at least one RA procedure of the first type has been successfully performed, and/or after the UE has been configured.

In some variants, the first procedure type and second procedure type both pertain to CBRA, or both pertain to CFRA, e.g. at different times or occasions. The first set of parameters may in some cases be cell-specific. The second set may be UE-specific, or it may comprise one or more cell-specific parameters and one or more UE-specific parameters.

It may be considered that the second set or the first set, and/or the procedure type, to be used is indicated based on control signaling and/or based on an identity used for scrambling signaling (e.g., by the network node). In some cases, the procedure type may be associated to the set being used. For example, the first procedure type and the second procedure type may be distinguished due to the first set being used for the first procedure type, and the second set being used for the second procedure type. In this context, no functional difference (e.g., CBRA/CFRA) may be present between the procedure types.

BRIEF DESCRIPTION OF THE DRAWINGS

The drawings are provided to illustrate concepts and approaches described herein, and are not intended to limit their scope. The drawings comprise.

DETAILED DESCRIPTION

In the following, variants are described in the context of NR, however, the approaches may be implemented in different contexts.

A random-access (RA) procedure is a key function in a cellular system. In NR, a UE that would like to access the network initiates the random-access procedure by transmitting a preamble (Msg1) in the uplink on the Physical Random Access Channel (PRACH). A gNB (next generation Node B, or TRP, Transmission and Reception Point, e.g. a base station, access node) receiving the preamble and detecting the random-access attempt will respond in the downlink by transmitting a random-access response (RAR/Msg2). The RAR carries an uplink scheduling grant for the UE to continue the procedure by transmitting a following subsequent message in the uplink for terminal identification.

The random-access procedure may be triggered by one of a number of events, for instance:

Initial access from RRC_IDLE;

RRC Connection Re-establishment procedure;

Handover;

DL or UL data arrival during RRC_CONNECTED when UL synchronisation status is "non-synchronised";

Transition from RRC_INACTIVE;

To establish time alignment at SCell addition;

Request for other SI;

Beam failure recovery.

Random access procedures may take two distinct forms, corresponding to a first procedure type and a second procedure type: contention-based random access (CBRA) and contention-free random access (CFRA).

Figure 1:
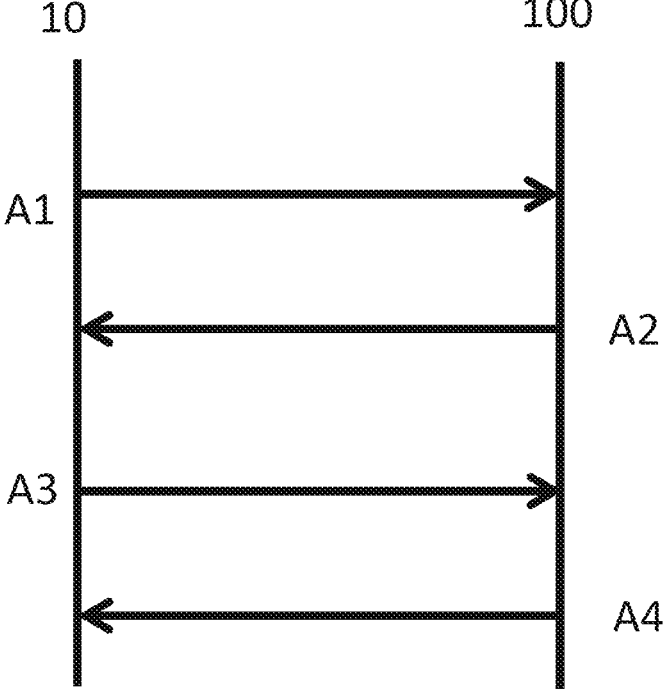
FIG. 1, showing an exemplary random access.

FIG. 1 shows an exemplary CBRA procedure. Contention-based random access is used e.g. for initial access when a UE 10 wants to access the network (gNB 100). In this case, the UE select a preamble from a set of allowed preambles at random and transmits the selected preamble in action A1 as msg1. The set of preambles may be predefined or be cell-specific; the UE 10 may select the preamble randomly. The gNB 100 does not know at priori which UE will access the system (and when), and there is also a certain probability that multiple UEs independently selected the same preamble at the same time. Hence there is a need for a contention resolution procedure to determine which UE (if any) that won the contents and is allowed to access the system. In response to receiving the msg1, the gNB 100 transmits a random access response (RAR, also referred to as msg2) in an action A2. The msg2 comprises information indicating resources for a transmission on PUSCH (representing a scheduling grant or uplink grant), as well as other information, and may comprise additional information, e.g. regarding timing like a timing advance and/or a temporary identifier. In response to receiving msg2, the UE 10 transmits a msg3 on the indicated resources (e.g., on PUSCH) in action A3. Msg3 may comprise data, and/or identify the UE. In response to receiving msg3, in action A4 the gNB 100 may transmit a msg4 which may provide contention resolution, and/or may provide configuration information, e.g. for RRC configuration. The contention resolution, uniquely identifying the UE 10 that is granted access, may be handled by msg 3 and msg 4 as shown in FIG. 1. The procedure of FIG. 1 can also be used for CFRA, based on a configured preamble.

Figure 2:
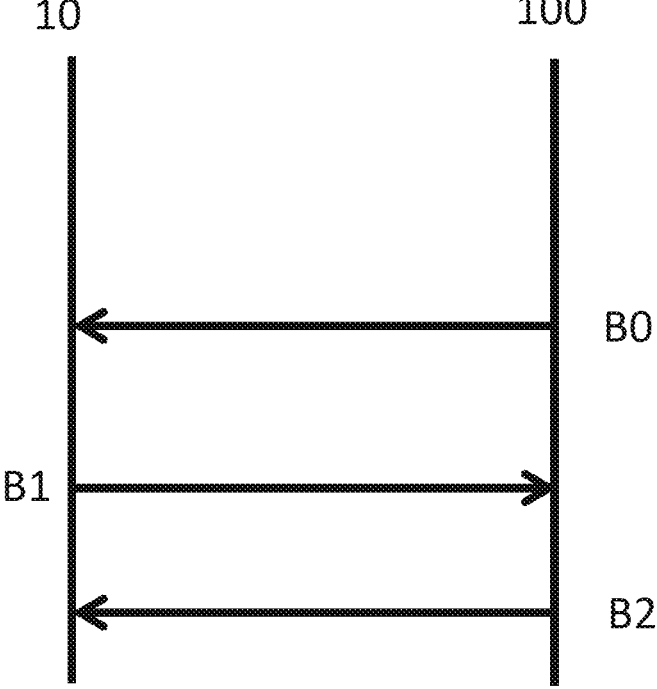
FIG. 2, showing another exemplary random access.

FIG. 2 shows an example of contention-free RA (CFRA), as an example of a second procedure type. Contention-free random access is used e.g. for handover purposes when one gNB wants the UE to perform a random access to another gNB for uplink synchronization as part of the handover procedure. In this case, the sourcing gNB indicates (configures) to the UE which preamble to use, selected from a set of preambles the UEs cannot choose from as part of a contention-based random access. Therefore, the receiving gNB in this case knows which UE is performing random access, and there is no need for a contention resolution step. In an action B0, the gNB 100 may configure the UE 10 with a preamble to use for random access of the second procedure type. The preamble may be UE-specific or group-specific. Thus, a UE or group of UEs may be unambiguously identified by the preamble. In action B1, the UE 10 may initiate random access by transmitting the preamble (as msg1). The gNB 100 may respond in action B2 with a random access response (msg2), e.g. with uplink timing (like a timing advance). No msg3 and msg4 are needed in this context, as contention resolution is unnecessary.

The random-access response (msg 2) is transmitted within a certain time window after the reception of the preamble (msg1) by the gNB. If the UE detects a DCI message with format 1_0 with CRC scrambled by the corresponding RA-RNTI (identifier used for random access) and a transport block within the window, the UE passes the transport block to higher layers. The higher layers parse the transport block for a random-access preamble identity (RAPID) associated with the PRACH transmission. If the higher layers identify the RAPID in RAR message(s) of the transport block, the higher layers indicate an uplink grant to the physical layer. This is referred to as random access response (RAR) UL grant in the physical layer specifications. In general, msg2 may be transmitted on PDCCH or PDSCH, depending on type of procedure.

It is suggested using different sets of parameters in particular for CBRA and CFRA, considering that CFRA may utilise preexisting configuration. Thus, it may be switched between sets after CBRA has been performed.

For NR, different bandwidth parts may be used. It is proposed to use different BWP for different RA procedure types, e.g. an initial BWP (which may be used for initial access) for CBRA and a configured BWP for CFRA. Accordingly, for example a wider BWP may be used for CFRA, allowing improved efficiency, e.g. regarding to one or more of latency (as a UE does not have to switch from an active BWP to the initial BWP to perform RA), scheduler flexibility (as more frequency range is available) and processing complexity (due to less complex and dense signaling).

Alternatively, or additionally, slot aggregation for CFRA facilitates improved coverage. A configured slot aggregation (for PUSCH and/or PUCCH) may be reused for RA, in particular msg1 and/or msg3. Slot aggregation may refer to automatic repetition (more than one transmission of a message like msg1 or msg3, respectively its content) in consecutive slots, e.g. without waiting for a response from the gNB.

There is generally proposed an approach of including information about the set of parameters or configuration(s) (in particular, second set, and/or first set) to use for PUSCH transmission (or PRACH transmission, and/or for msg1 and/or msg3) as part of the random-access response (msg 2), e.g. for contention-free random access. The configurations/set indicate different behavior(s) for PUSCH and/or PRACH transmission initiated by contention-free random access and contention-based random access after received msg2. This information may represent one or more parameters of the second set of parameters. In general, other signaling may be used for configuring the set/s and/or configuration/s. It may be generally be considered that a set of parameters represents a configuration or part of a configuration.

The approaches described herein allow supporting the UE with lower latency and/or better spectrum efficiency and/or better coverage.

It may generally be considered including information about the parameters to use for PUSCH transmission as part of the random-access response (msg 2) for contention-free random access. To handle UEs operating according to an earlier version of the specifications (e.g. release 15), multiple configurations of random-access parameters need to be supported.

The set of parameters may comprise one cell-specific set of parameters (this is the only set of parameters possible in release 15). This set of parameters may be supported by all UEs, and may e.g. be a first set;

one or more set of parameters (e.g., second set/s), which may be supported by some UEs only, e.g. based on capability. This set of parameters may be configured to the UE using dedicated RRC signaling, e.g. after the network has obtained knowledge of the UE capabilities (for example, whether a UE supports a certain set of parameters of not). Alternatively, the parameters can be configured using cell-specific signaling in which case the gNB may ensure that UEs are using only the subset of these parameters it can support.

For CBRA, the cell-specific baseline parameters (first set) may be applied, as the UE capability and the configurations received is unknown to the network. However, for CFRA, dedicated configurations (second set/s) can be applied to the corresponding transmission. Which of the configurations to use (first set, or a second set) may be signaled to the UE by using msg2, or msg4, e.g. in CBFA.

Thus, a UE of a later release can perform a different CFRA procedure according to the signaling from network. CFRA can apply either a cell specific configuration for MSG3, or a UE specific configuration according to network demands. CFRA can apply either lowest/MSG3 UE capability requirement or other UE capability requirement.

When performing CFRA according to UE specific configuration, following one or more behaviors can be different from cell specific configuration, e.g. following a second set of parameters:

it may be indicated which BWP to apply, e.g. active BWP or initial BWP; and/or it may be indicated whether timing corresponding to the UE processing capability or the default timing supported by all UEs it to be applied; and/or which waveform or transmission scheme to apply, e.g. whether to use OFDM/A or SC-FDM/A (also referred to as DFT-OFDM/A), e.g. based on cell level configuration Msg3-transformPrecoder or dedicated UE configuration PUSCH-Config; and/or it may be indicated whether to use repetition or not, e.g. to apply the same repetition as pusch-AggregationFactor in dedicated UE configuration PUSCH-Config or cell Level configuration as MSG3; and/or one or more other parameters, e.g. other PUSCH parameter/s, may be indicated to be applied, e.g. MCS table, scrambling identity, rank, scaling, etc.

It may be considered that a UE capability of performing different CFRA behavior can be indicated at UE capability in RRC signaling or as basic UE feature. Indication of CFRA behavior may be carried and/or indicated in a random-access response message (msg2). Multiple possibilities exist. For example, it can be received in MSG2 PDCCH or in RAR Grant carried in MSG2 PDSCH. In the former case (using PDCCH), different RNTIs can be envisioned. For example, the current RA-RNTI may imply default behavior, while a new RA-RNTI (or the C-RNTI) may imply that the new, alternative set of parameters should be used.

In the latter case (using msg2), reserved bits or TC-RNTI field in RAR grant can be used to select the behavior. A single bit can be used to indicate either legacy behavior or new CFRA behavior. If multiple bits are used, it is also possible to select between multiple preconfigured behaviors (multiple sets of parameters). For example, with 2 bits, 00 can imply the legacy release 15 behavior while 01, 10, and 11 implies three preconfigured sets of parameters.

One or more fields in the signaling that could be used for indication of different CFRA behavior comprise:

MAC RAR
    Reserved bit
    TC-RNTI field
        reserved values for RNTI field can be used
    Reuse of existing RAR grant field
        FDRA when BWP smaller than X RBs, X is an integer.
        Unused combinations
    Reserved bit in MSG2 with RA-RNTI The indication can also be carried with MSG2 PDCCH signal using reserved bits in DCI or unused value in DCI fields.

CFRA behavior can distinguish legacy release 15 behavior or new behavior via signaling indication from the network (e.g., a network node). The CFRA behavior can be associated with different UE capability or UE version according to NR release. Legacy behaviour for CFRA may correspond to use of the first set of parameters for CFRA, and/or use of the same set for both CBRA or CFRA. New behaviour may correspond to use of different sets of param-eters for different types of RA procedures, e.g. a first set for CBRA and a second set for CFRA.

Figure 3:
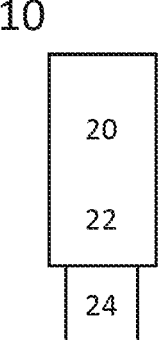
FIG. 3, showing an exemplary radio node implemented as terminal or UE.

FIG. 3 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiv-ing and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise correspond-ing circuitry, e.g. processing circuitry, and/or modules.

Figure 4:
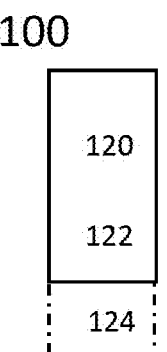
FIG. 4, showing an exemplary radio node implemented as network node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmis-sion timing structure and/or symbol and/or slot and/or mini-slot and/or subcarrier and/or carrier may pertain to a specific numerology, which may be predefined and/or con-figured or configurable. A transmission timing structure may represent a time interval, which may cover one or more symbols. Some examples of a transmission timing structure are transmission time interval (TTI), subframe, slot and mini-slot. A slot may comprise a predetermined, e.g. pre-defined and/or configured or configurable, number of sym-bols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing struc-tures used and/or scheduled for transmission, e.g. slot and/or mini-slots, may be scheduled in relation to, and/or synchro-nized to, a timing structure provided and/or defined by other transmission timing structures. Such transmission timing structures may define a timing grid, e.g., with symbol time intervals within individual structures representing the small-est timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be config-urable to start and/or end at any symbol of the transmission timing structure, in particular one or more slots.

There is generally considered a program product com-prising instructions adapted for causing processing and/or control circuitry to carry out and/or control any method described herein, in particular when executed on the pro-cessing and/or control circuitry. Also, there is considered a carrier medium arrangement carrying and/or storing a pro-gram product as described herein.

A carrier medium arrangement may comprise one or more carrier media. Generally, a carrier medium may be acces-sible and/or readable and/or receivable by processing or control circuitry. Storing data and/or a program product and/or code may be seen as part of carrying data and/or a program product and/or code. A carrier medium generally may comprise a guiding/transporting medium and/or a stor-age medium. A guiding/transporting medium may be adapted to carry and/or carry and/or store signals, in par-ticular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise provid-ing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, if transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signal-ings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
CAZAC Constant Amplitude Zero Cross Correlation
CBG Code Block Group CDM Code Division Multiplex CM Cubic Metric CQI Channel Quality Information CRC Cyclic Redundancy Check CRS Common reference signal CSI Channel State Information CSI-RS Channel state information reference signal DAI Downlink Assignment Indicator DCI Downlink Control Information DFT Discrete Fourier Transform DM(-)RS Demodulation reference signal(ing)

FDM Frequency Division Multiplex

HARQ Hybrid Automatic Repeat Request

IFFT Inverse Fast Fourier Transform

MBB Mobile Broadband

MCS Modulation and Coding Scheme

MIMO Multiple-input-multiple-output

MRC Maximum-ratio combining

MRT Maximum-ratio transmission

MU-MIMO Multiuser multiple-input-multiple-output

OFDM/A Orthogonal Frequency Division Multiplex/Multiple Access

PAPR Peak to Average Power Ratio

PDCCH Physical Downlink Control Channel

PDSCH Physical Downlink Shared Channel

PRACH Physical Random Access CHannel

PRB Physical Resource Block

PUCCH Physical Uplink Control Channel

PUSCH Physical Uplink Shared Channel (P)SCCH (Physical) Sidelink Control Channel (P)SSCH (Physical) Sidelink Shared Channel RB Resource Block RRC Radio Resource Control SC-FDM/A Single Carrier Frequency Division Multiplex/Multiple Access SCI Sidelink Control Information SI System Information (high-level information, e.g. cell-specific)

SINR Signal-to-interference-plus-noise ratio

SIR Signal-to-interference ratio

SNR Signal-to-noise-ratio

SR Scheduling Request

SRS Sounding Reference Signal(ing)

SVD Singular-value decomposition

TDM Time Division Multiplex

UCI Uplink Control Information

UE User Equipment

URLLC Ultra Low Latency High Reliability Communication

VL-MIMO Very-large multiple-input-multiple-output

ZF Zero Forcing

Abbreviations may be considered to follow 3GPP usage if applicable.

The invention claimed is:

1. A method of operating a network node in a radio access network, the method comprising:

performing a random access response procedure based on a set of access parameters, the random access response procedure being performed by the network node in response to a transmission of a random access preamble from a user terminal, UE, the random access response procedure being one of a first procedure type and a second procedure type, the first procedure type representing contention-based random access (CBRA) and the second procedure type representing contention-free random access (CFRA), a first set of access parameters being used for a random access response procedure of the first procedure type and a second set of access parameters being used for a random access response procedure of the second procedure type;

the random access response procedure of the first procedure type including broadcasting an indication of a set of cell-specific random access preambles; and the random access response procedure of the second procedure type including transmitting an indication of a UE-specific random access preamble, the random access response procedure of the second procedure type being performed after performing the random access response procedure of the first procedure type.

2. The method according to claim 1, wherein at least one of the first set of access parameters and the second set of access parameters comprises physical parameters.

3. The method according to claim 1, wherein the first set of access parameters and the second set of access parameters comprise different numbers of parameters.

4. The method according to claim 3, wherein the different numbers of parameters are different numbers of physical parameters.

5. The method according to claim 1, wherein the second set of parameters comprises one or more parameters configured with Radio Resource Control, RRC, layer signaling.

6. The method according to claim 1, wherein the first procedure type is based on the transmission of the random access preamble from a set of random access preambles, and wherein the set of random access preambles is at least one of:

predefined;

cell-wide;

indicated via broadcast; and indicated by groupcast signaling.

7. The method according to claim 1, wherein the second procedure type is based on a transmission of at least one of a configured preamble and a UE-specific preamble.

8. The method according to claim 1, wherein the second set of access parameters further indicates a bandwidth part.

9. The method according to claim 1, wherein the second set of access parameters comprises one or more parameters pertaining to at least one of a transmission on a Physical Uplink Shared Channel, PUSCH, and a transmission on a Physical Downlink Shared Channel, PDSCH.

10. The method according to claim 1, wherein the first set of parameters is a subset of the second set of parameters.

11. A network node for a radio access network, the network node comprising processing circuitry configured to:

perform a random access response procedure based on a set of access parameters, the random access response procedure being performed by the network node in response to a transmission of a random access preamble from a user terminal, UE, the random access response procedure being one of a first procedure type and a second procedure type, the first procedure type representing contention-based random access (CBRA) and the second procedure type representing contention-free random access (CFRA), a first set of access parameters being used for a random access response procedure of the first procedure type and a second set of access parameters being used for a random access response procedure of the second procedure type the random access response procedure of the first procedure type including broadcasting an indication of a set of cell-specific random access preambles; and the random access response procedure of the second procedure type including transmitting an indication of a UE-specific random access preamble, the random access response procedure of the second procedure type being performed after performing the random access response procedure of the first procedure type.

12. A method of operating a user equipment, UE, in a radio access network, the method comprising:

performing a random access request procedure based on a set of access parameters, the random access request procedure being performed by the UE to request a random access from a network node using a transmission of a random access preamble, the random access request procedure being one of a first procedure type and a second procedure type, the first procedure type representing contention-based random access (CBRA) and the second procedure type representing contention-free random access (CFRA), a first set of access parameters being used for a random access request procedure of the first procedure type and a second set of access parameters being used for a random access request procedure of the second procedure type the random access request procedure of the first procedure type including receiving a broadcast indication of a set of cell-specific random access preambles; and the random access request procedure of the second procedure type including receiving an indication of a UE-specific random access preamble, the random access request procedure of the second procedure type being performed after performing the random access request procedure of the first procedure type.

13. The method according to claim 12, wherein at least one of the first set of access parameters and the second set of access parameters comprises physical parameters.

14. The method according to claim 12, wherein the first set of access parameters and the second set of access parameters comprise different numbers of parameters.

15. The method according to claim 12, wherein the second set of parameters comprises one or more parameters configured with Radio Resource Control, RRC, layer signaling.

16. The method according to claim 12, wherein the first procedure type is based on the transmission of the random access preamble from a set of random access preambles, and wherein the set of random access preambles is at least one of:

predefined;

cell-wide;

indicated via broadcast; and indicated by groupcast signaling.

17. A user equipment, UE, for a radio access network, the UE comprising processing circuitry configured to:

perform a random access request procedure based on a set of access parameters, the random access request procedure being performed by the UE to request a random access from a network node using a transmission of a random access preamble, the random access request procedure being one of a first procedure type and a second procedure type, the first procedure type representing contention-based random access (CBRA) and the second procedure type representing contention-free random access (CFRA), a first set of access parameters being used for a random access request procedure of the first procedure type and a second set of access parameters being used for a random access request procedure of the second procedure type the random access request procedure of the first procedure type including receiving a broadcast indication of a set of cell-specific random access preambles; and the random access request procedure of the second procedure type including receiving an indication of a UE-specific random access preamble, the random access request procedure of the second procedure type being performed after performing the random access request procedure of the first procedure type.

18. A non-transitory computer storage medium storing a computer program comprising instructions configured to cause processing circuitry to at least one of control and perform a method, the method comprising:

performing a random access response procedure based on a set of access parameters, the random access response procedure being performed by a network node in response to a transmission of a random access preamble from a user terminal, UE, the random access response procedure being one of a first procedure type and a second procedure type, the first procedure type representing contention-based random access (CBRA) and the second procedure type representing contention-free random access (CFRA), a first set of access parameters being used for a random access response procedure of the first procedure type and a second set of access parameters being used for a random access response procedure of the second procedure type the random access response procedure of the first procedure type including broadcasting an indication of a set of cell-specific random access preambles; and the random access response procedure of the second procedure type including transmitting an indication of a UE-specific random access preamble, the random access response procedure of the second procedure type being performed after performing the random access response procedure of the first procedure type.

* * * * *